(12) United States Patent
Wiser

(10) Patent No.: US 8,135,772 B2
(45) Date of Patent: Mar. 13, 2012

(54) SINGLE SERVLETS FOR B2B MESSAGE ROUTING

(75) Inventor: David Wiser, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 1307 days.

(21) Appl. No.: 10/404,666

(22) Filed: Apr. 1, 2003

(65) Prior Publication Data

US 2004/0010611 A1 Jan. 15, 2004

Related U.S. Application Data

(60) Provisional application No. 60/376,932, filed on May 1, 2002.

(51) Int. Cl.
*G06F 15/16* (2006.01)
(52) U.S. Cl. .......... 709/203; 709/201; 709/202
(58) Field of Classification Search .......... 709/230, 709/227, 223–224, 201–203; 370/466; 705/8
See application file for complete search history.

(56) References Cited

U.S. PATENT DOCUMENTS

| | | |
|---|---|---|
| 5,321,841 A | 6/1994 | East et al. ................ 395/725 |
| 5,469,562 A | 11/1995 | Saether |
| 5,604,860 A | 2/1997 | McLaughlin et al. |
| 5,630,131 A | 5/1997 | Palevich et al. |
| 5,748,975 A | 5/1998 | Van De Vanter ............ 395/793 |
| 5,801,958 A | 9/1998 | Dangelo et al. |
| 5,835,769 A | 11/1998 | Jervis et al. ................ 395/701 |
| 5,836,014 A | 11/1998 | Faiman |
| 5,862,327 A | 1/1999 | Kwang et al. ................ 395/200 |
| 5,867,822 A | 2/1999 | Sankar |
| 5,933,838 A | 8/1999 | Lomet ........................ 707/202 |
| 5,944,794 A | 8/1999 | Okamoto et al. |
| 5,950,010 A | 9/1999 | Hesse et al. ................ 395/712 |
| 5,961,593 A | 10/1999 | Gabber et al. ............... 709/219 |

(Continued)

FOREIGN PATENT DOCUMENTS

CA 2 248 634 3/2000

(Continued)

OTHER PUBLICATIONS

Coward, D., "Java Servlet Specification Version 2.3". Final Release Aug. 13, 2001. [retreived from Internet—Google—"http://www.orionserver.com/docs/specifications/servlet-2_3-fcs-spec.pdf" on Mar. 20, 2009].*

(Continued)

*Primary Examiner* — Philip Chea
*Assistant Examiner* — Lashanya Nash
(74) *Attorney, Agent, or Firm* — Fliesler Meyer LLP

(57) ABSTRACT

A number of approaches can be taken to improve the routing of client requests to business protocol destinations. In one such approach, a business servlet registers itself as a default servlet such that it receives any request not recognized by the system. In another embodiment, internal APIs can be used to route all messages to a business servlet, which can use internal APIs to redirect the request if the business servlet does not recognize the request. In another embodiment, filters can be used in conjunction with a lookup table containing address information to route requests to the proper destination.

This description is not intended to be a complete description of, or limit the scope of, the invention. Other features, aspects, and objects of the invention can be obtained from a review of the specification, the figures, and the claims.

17 Claims, 4 Drawing Sheets

U.S. PATENT DOCUMENTS

| | | | |
|---|---|---|---|
| 5,966,535 A | 10/1999 | Benedikt et al. | |
| 6,012,083 A | 1/2000 | Savitzky et al. | |
| 6,016,495 A | 1/2000 | McKeehan et al. | |
| 6,018,730 A | 1/2000 | Nichols et al. | |
| 6,023,578 A | 2/2000 | Birsan et al. | |
| 6,023,722 A | 2/2000 | Colyer | 709/201 |
| 6,028,997 A | 2/2000 | Leymann et al. | |
| 6,029,000 A | 2/2000 | Woolsey et al. | |
| 6,044,217 A | 3/2000 | Brealey et al. | 395/701 |
| 6,067,548 A | 5/2000 | Cheng | 707/103 |
| 6,067,623 A | 5/2000 | Blakley, III et al. | 713/204 |
| 6,070,184 A | 5/2000 | Blount et al. | |
| 6,085,030 A | 7/2000 | Whitehead et al. | 395/200.33 |
| 6,092,102 A | 7/2000 | Wagner | |
| 6,098,093 A * | 8/2000 | Bayeh et al. | 709/203 |
| 6,119,149 A | 9/2000 | Notani | 709/205 |
| 6,141,686 A | 10/2000 | Jackowski et al. | 709/224 |
| 6,141,701 A | 10/2000 | Whitney | |
| 6,148,336 A | 11/2000 | Thomas et al. | |
| 6,189,044 B1 * | 2/2001 | Thomson et al. | 709/242 |
| 6,212,546 B1 | 4/2001 | Starkovich et al. | |
| 6,222,533 B1 | 4/2001 | Notani et al. | 345/329 |
| 6,226,675 B1 | 5/2001 | Meltzer et al. | 709/223 |
| 6,230,287 B1 | 5/2001 | Pinard et al. | 714/31 |
| 6,230,309 B1 | 5/2001 | Turner et al. | 717/1 |
| 6,237,135 B1 | 5/2001 | Timbol | 717/1 |
| 6,243,737 B1 | 6/2001 | Flanagan et al. | |
| 6,282,711 B1 | 8/2001 | Halpern et al. | 717/11 |
| 6,292,932 B1 | 9/2001 | Baisley et al. | |
| 6,311,327 B1 | 10/2001 | O'Brien et al. | |
| 6,324,681 B1 | 11/2001 | Sebesta et al. | 717/1 |
| 6,330,569 B1 | 12/2001 | Baisley et al. | |
| 6,334,114 B1 | 12/2001 | Jacobs et al. | |
| 6,336,122 B1 | 1/2002 | Lee et al. | 707/204 |
| 6,338,064 B1 | 1/2002 | Ault et al. | 707/9 |
| 6,339,832 B1 | 1/2002 | Bowman-Amuah | |
| 6,343,265 B1 | 1/2002 | Glebov et al. | |
| 6,345,283 B1 | 2/2002 | Anderson | |
| 6,348,970 B1 | 2/2002 | Marx | |
| 6,349,408 B1 | 2/2002 | Smith | 717/11 |
| 6,353,923 B1 | 3/2002 | Bogle et al. | 717/4 |
| 6,360,221 B1 | 3/2002 | Gough | |
| 6,360,358 B1 | 3/2002 | Elsbree et al. | |
| 6,367,068 B1 | 4/2002 | Vaidyanathan et al. | |
| 6,377,939 B1 | 4/2002 | Young | |
| 6,393,605 B1 | 5/2002 | Loomans | 717/121 |
| 6,408,311 B1 | 6/2002 | Baisley et al. | |
| 6,411,698 B1 | 6/2002 | Bauer et al. | |
| 6,445,711 B1 | 9/2002 | Scheel et al. | |
| 6,463,503 B1 | 10/2002 | Jones et al. | 711/114 |
| 6,470,364 B1 | 10/2002 | Prinzing | |
| 6,516,322 B1 | 2/2003 | Meredith | |
| 6,549,949 B1 | 4/2003 | Bowman-Amuah | 709/236 |
| 6,560,769 B1 | 5/2003 | Moore et al. | |
| 6,567,738 B2 | 5/2003 | Gopp et al. | |
| 6,584,454 B1 | 6/2003 | Hummel, Jr. et al. | |
| 6,594,693 B1 | 7/2003 | Borwankar | 709/219 |
| 6,594,700 B1 * | 7/2003 | Graham et al. | 709/230 |
| 6,601,113 B1 | 7/2003 | Koistinen et al. | |
| 6,604,198 B1 | 8/2003 | Beckman et al. | 713/167 |
| 6,609,115 B1 | 8/2003 | Mehring et al. | |
| 6,615,258 B1 | 9/2003 | Barry et al. | |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,654,932 B1 | 11/2003 | Bahrs et al. | |
| 6,678,518 B2 * | 1/2004 | Eerola | 455/422.1 |
| 6,684,388 B1 | 1/2004 | Gupta et al. | |
| 6,687,702 B2 | 2/2004 | Vaitheeswaran et al. | |
| 6,687,848 B1 | 2/2004 | Najmi | |
| 6,721,740 B1 | 4/2004 | Skinner et al. | |
| 6,721,747 B2 | 4/2004 | Lipkin | |
| 6,721,779 B1 | 4/2004 | Maffeis | |
| 6,732,237 B1 | 5/2004 | Jacobs et al. | |
| 6,748,420 B1 | 6/2004 | Quatrano et al. | |
| 6,754,884 B1 | 6/2004 | Lucas et al. | |
| 6,757,689 B2 | 6/2004 | Battas et al. | |
| 6,789,054 B1 | 9/2004 | Makhlouf | |
| 6,795,967 B1 | 9/2004 | Evans et al. | 719/310 |
| 6,799,718 B2 | 10/2004 | Chan et al. | |
| 6,802,000 B1 | 10/2004 | Greene et al. | 713/168 |
| 6,804,686 B1 | 10/2004 | Stone et al. | |
| 6,823,495 B1 | 11/2004 | Vedula et al. | |
| 6,832,238 B1 | 12/2004 | Sharma et al. | |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,874,143 B1 | 3/2005 | Murray et al. | |
| 6,889,244 B1 | 5/2005 | Gaither et al. | |
| 6,915,519 B2 | 7/2005 | Williamson et al. | |
| 6,918,084 B1 | 7/2005 | Slaughter et al. | |
| 6,922,827 B2 | 7/2005 | Vasilik et al. | |
| 6,925,482 B2 * | 8/2005 | Gopal et al. | 709/201 |
| 6,950,872 B2 * | 9/2005 | Todd, II | 709/227 |
| 6,959,307 B2 | 10/2005 | Apte | |
| 6,959,340 B1 * | 10/2005 | Najmi | 709/246 |
| 6,963,914 B1 | 11/2005 | Breitbart et al. | |
| 6,971,096 B1 | 11/2005 | Ankireddipally et al. | |
| 6,976,086 B2 | 12/2005 | Sadeghi et al. | |
| 6,993,743 B2 | 1/2006 | Crupi et al. | |
| 7,000,219 B2 | 2/2006 | Barrett et al. | |
| 7,007,088 B1 * | 2/2006 | Najmi | 709/225 |
| 7,017,146 B2 | 3/2006 | Dellarocas et al. | |
| 7,032,005 B2 * | 4/2006 | Mathon et al. | 709/206 |
| 7,051,072 B2 | 5/2006 | Stewart et al. | |
| 7,051,316 B2 | 5/2006 | Charisius et al. | |
| 7,054,858 B2 | 5/2006 | Sutherland | |
| 7,062,718 B2 | 6/2006 | Kodosky et al. | |
| 7,069,507 B1 | 6/2006 | Alcazar et al. | |
| 7,072,934 B2 | 7/2006 | Helgeson et al. | |
| 7,073,167 B2 | 7/2006 | Iwashita | |
| 7,076,772 B2 | 7/2006 | Zatloukal | |
| 7,089,568 B2 | 8/2006 | Yoshida et al. | |
| 7,089,584 B1 | 8/2006 | Sharma | |
| 7,107,578 B1 | 9/2006 | Alpern | |
| 7,111,243 B1 | 9/2006 | Ballard et al. | |
| 7,117,504 B2 | 10/2006 | Smith et al. | |
| 7,127,704 B2 | 10/2006 | Van De Vanter et al. | |
| 7,143,186 B2 * | 11/2006 | Stewart et al. | 709/245 |
| 7,146,422 B1 | 12/2006 | Marlatt et al. | |
| 7,150,015 B2 | 12/2006 | Pace et al. | |
| 7,155,705 B1 | 12/2006 | Hershberg et al. | |
| 7,184,967 B1 | 2/2007 | Mital et al. | |
| 7,240,331 B2 | 7/2007 | Vion-Dury et al. | |
| 2001/0016880 A1 * | 8/2001 | Cai et al. | 709/321 |
| 2001/0032263 A1 | 10/2001 | Gopal et al. | |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0016759 A1 | 2/2002 | Marcready et al. | |
| 2002/0035604 A1 | 3/2002 | Cohen et al. | |
| 2002/0049788 A1 | 4/2002 | Lipkin et al. | |
| 2002/0073080 A1 | 6/2002 | Lipkin | |
| 2002/0078365 A1 | 6/2002 | Burnett et al. | 713/200 |
| 2002/0083075 A1 | 6/2002 | Brummel et al. | |
| 2002/0111922 A1 | 8/2002 | Young et al. | |
| 2002/0120685 A1 | 8/2002 | Srivastava et al. | |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0174178 A1 | 11/2002 | Stawikowski | |
| 2002/0174241 A1 | 11/2002 | Beged-Dov et al. | |
| 2002/0184145 A1 * | 12/2002 | Sijacic et al. | 705/40 |
| 2002/0184610 A1 | 12/2002 | Chong et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0002526 A1 * | 1/2003 | Dias et al. | 370/466 |
| 2003/0004746 A1 | 1/2003 | Kheirolomoom et al. | |
| 2003/0005181 A1 * | 1/2003 | Bau et al. | 709/330 |
| 2003/0014439 A1 | 1/2003 | Boughannam | |
| 2003/0018661 A1 | 1/2003 | Darugar | |
| 2003/0018665 A1 | 1/2003 | Dovin et al. | |
| 2003/0018832 A1 | 1/2003 | Amierisetty et al. | |
| 2003/0037153 A1 * | 2/2003 | Ouchi | 709/230 |
| 2003/0041198 A1 | 2/2003 | Exton et al. | 710/200 |

| | | |
|---|---|---|
| 2003/0285759 | 2/2003 | Kulkarni et al. |
| 2003/0043191 A1 | 3/2003 | Tinsley et al. |
| 2003/0046266 A1 | 3/2003 | Mullins et al. |
| 2003/0055868 A1 | 3/2003 | Fletcher et al. |
| 2003/0055878 A1 | 3/2003 | Fletcher et al. |
| 2003/0074217 A1 | 4/2003 | Beisiegel et al. |
| 2003/0074467 A1 | 4/2003 | Oblak et al. |
| 2003/0079029 A1 | 4/2003 | Garimella et al. |
| 2003/0110117 A1 | 6/2003 | Saidenbereg et al. |
| 2003/0110446 A1 | 6/2003 | Nemer |
| 2003/0126136 A1 | 7/2003 | Omoigui |
| 2003/0149791 A1* | 8/2003 | Kane et al. ............ 709/246 |
| 2003/0167358 A1 | 9/2003 | Marvin et al. |
| 2003/0196168 A1 | 10/2003 | Hu |
| 2003/0204559 A1* | 10/2003 | Nguyen ............ 709/203 |
| 2003/0208374 A1* | 11/2003 | Mangtani et al. ......... 705/1 |
| 2003/0233631 A1 | 12/2003 | Curry |
| 2004/0019645 A1 | 1/2004 | Goodman et al. |
| 2004/0040011 A1 | 2/2004 | Bosworth et al. |
| 2004/0068568 A1 | 4/2004 | Griffin |
| 2004/0078373 A1 | 4/2004 | Ghoneimy et al. |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2006/0206856 A1 | 9/2006 | Breeden et al. |
| 2006/0234678 A1 | 10/2006 | Juitt et al. |
| 2007/0038500 A1 | 2/2007 | Hammitt et al. |

FOREIGN PATENT DOCUMENTS

| | | |
|---|---|---|
| WO | 99/23558 | 5/1999 |
| WO | 00/29924 | 5/2000 |
| WO | 01/90884 A2 | 11/2001 |

OTHER PUBLICATIONS

Nyberg, G., Patrick, R., Bauerschmidt, P., McDaniel, J., Makherjee, R., Excerpt from Book—"Mastering BEA WebLogic Server:Best Practices for Building and Deploying J2EE Applications"., pp. 1-38. [retrieved from Internet-Google—"http://media.wiley.com/product_data/excerpt/8X/04712812/047128128X.pdf" on Mar. 20, 2009].*

Coward, D., Java servlet specification version 2.3. 2002. pp. 1-257. [retrieved from Internet "http://java.sun.com/products/servlet" on Jul. 17, 2010].*

"Introducing Microsoft DotNet"; by ChristopheLauer, Jul. 2, 2002; http://web.archive.org/web/20020702162429/http://www.freevbcode.com/ShowCode.asp?ID=2171; pp. 1-10.

C. Moran et al. "*ARIES: A Transaction Recovery Method Supporting Fine-Granularity Locking and Partial Rollbacks Using Write-Ahead Logging*", ACM Transaction on Database Systems, vol. 17, No. 1, Mar. 1992, pp. 94-162.

Hewlett-Packard, *HP Application Server*, Technical Guide Version 8.0, HP, Nov. 15, 2001, pp. 1-234.

Sun Microsystems, *Iplanet Application Server 6.0 White Paper*, iPlanet E-Commerce Solutions, May 25, 2000, pp. 1-104.

Enrique Duvos & Azer Bestavros, *An Infrastructure for the Dynamic Distribution of Web Application and Services'*, Department of Computer Science Boston University, Dec. 2000, pp. 1-22.

Ed Roman & Rickard Öberg, *The Technical Benefits of EJB and J2EE Technologies over COM+ and Windows DNA*, Enterprise Edition (J2EE) Technologies, Dec. 1999, pp. 1-24.

Blake, Ruled-Driven Coordination Agent: "A Self-Configureable Agent Architecture for Distributed Control"; IEEE Mar. 2001, pp. 271-277.

Dahalin et al., Workflow Interoperability Using Extensible Markup Language (XML), IEEE, Jul. 2002, pp. 513-516.

Kunisetty "Workflow Modeling and simulation Using an Extensible Object-Oriented Knowledge Base Management System" Citeseer, 1996, pp. 1-60.

Van Der Aalst et al., Verification of XRL: An XML-Based Workflow Language, IEEE, Jul. 2001, pas. 427-432.

Sosnoski, "XML and Java Technologies: Data Binding, Part 1: Code Generation Approaches—JAXB and more", IBM, pp. 1-11, 2003.

Erich Liebmann et al., "Adaptive Data Dissemination and Caching for Edge Service Architectures Built with the J2EE", Mar. 2004, ACM Press, 2004 ACM Symposium on Applied Computing , pp. 1717-1724.

Chen et al., "eCo Architecture for Electronic Commerce Interoperability", Jun. 29, 1999, CommerceNet, pp. 1-107.

JAVA™ Debug Interface, definitions, retrieved from <URL http://java.sun.com/j2se/1.4.2/docs/guide/jpda/jdi/overview-summary.html, Feb. 21, 2007.

Embury et al., "Assisting the Comprehension of Legacy Transaction", Reverse Engineering, 2001, Proceedings, Eighth Working Conference on Oct. 2-5, 2001, pp. 345-354.

Mays et al., "A Persistent Store for Large Shared Knowledge Bases", Knowledge and Data Engineering, IEEE Transactions on vol. 3, Issue 1, Mar. 1991, pp. 33-41.

Tang et al., "Integrating Remote Invocation and Distributed Shared State", Parallel and Distributed Processing Symposium, 2004, Proceedings, 18th International, Apr. 26-30, 2004, (10 pages).

Kilgore, "Multi-Language, Open-Source Modeling Using the Microsoft Architecture", Simulation Conference, 2002, Proceedings of the Winter, Dec. 8-11, 2002, vol. 1, pp. 629-633.

Alonso, G., et al., "Advanced Transaction Models in Workflow Contexts," Proceedings of the 12th International Conference on Data Engineering, retrieved from http://citeseer.ist.psu.edu/alonso96advanced.html, 14 pages (Feb. 1996).

Altova, "XML-to-XML Mapping," pp. 1-6 (2007).

BEA, "Transforming Data Using the XQuery Mapper," BEA AquaLogic Service Bus 2.0 Documentation, pp. 1-19 (2006).

Bogunovic, Nikola, "A Programming Model for Composing Data-Flow Collaborative Applications," IEEE, 7 pages (Mar. 1999).

Jamper, "Jamper-Java XML Mapper," http://www.jamper.sourceforge.net/, pp. 1-4 (2007).

Plaindoux, Didier, "XML Transducers in Jave," The Eleventh International World Wide Web Conference, retrieved from http://www2002.org/CDROM/poster/132/index.html, 6 pages (May 2002).

Smith, Milton, et al., "Marching Towards a Software Reuse Future," ACM Ada Letters, vol. XIV, No. 6, pp. 62-72 (Nov./Dec. 1994).

Stylus Studio, "XQuery Mapper," http://www.stylusstudio.com/xquery_mapper.html, pp. 1-6 (2007).

Sung, S. Y., et al., "A Multimedia Authoring Tool for the Internet," IEEE, pp. 304-308 (1997).

Van der Aaslst, W.M.P., et al., "XML Based Schema Definition for Suport of the Inter-Organizational Workflow," University of Colorado and University of Eindhoven report, retrieved from http://citeseer.ist.psu.edu/vanderaalst00xml.html, 39 pages (2000).

Allamaraju, et al., "Professional Java Server Programming J2EE 1.3 Edition," WROX, pp. 1009-1057 (Sep. 2001).

Microsoft, "Microsoft.net Framework," Microsoft Corporation, 54 pages (2001).

Sun Microsystems, "J2EE Connector Architecture 1.0," retrieved from: http://www.javasun.com/J2ee/connector/download.html, 188 pages (Aug. 2001).

Supplementary European Search Report for EP 02 78 4131, 4 pages (dated Aug. 8, 2007).

Willink, Edward D., "Meta Compilation for C++," University of Surrey, 379 pages (Jan. 2000).

U.S. Appl. No. 10/404,552, filed Apr. 1, 2003, Mike Blevins et al.

U.S. Appl. No. 10/404,684, filed Apr. 1, 2003, Mike Blevins et al.

U.S. Appl. No. 10/404,865, filed Apr. 1, 2003, David Wiser.

Marcello Mariucci, *Enterprise Application Server Development Environments*, University of Stuttgart, Oct. 10, 2000, pp. 1-30.

* cited by examiner (a)

(b)

SINGLE SERVLETS FOR B2B MESSAGE ROUTING

CLAIM OF PRIORITY

This application claims priority to U.S. Provisional Patent Application No. 60/376,932, filed May 1, 2002, entitled "SINGLE SERVLETS FOR B2B MESSAGE ROUTING," which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/404,552 filed Apr. 1, 2003, now U.S. Pat. No. 7,519,976, issued on Apr. 14, 2009, to Mike Blevins and entitled, "COLLABORATIVE BUSINESS PLUG-IN FRAMEWORK";

(B) U.S. patent application Ser. No. 10/404,684 filed Apr. 1, 2003, now U.S. Pat. No. 7,424,717, issued on Sep. 9, 2008, to Mike Blevins and entitled, "SYSTEMS AND METHODS FOR BUSINESS PROCESS PLUG-IN DEVELOPMENT"; and (C) U.S. patent application Ser. No. 10/404,865 filed Apr. 1, 2003, now U.S. Pat. No. 7,257,645, issued on Aug. 14, 2007 to David Wiser and entitled, "SYSTEM AND METHOD FOR STORING LARGE MESSAGES".

FIELD OF THE INVENTION

The present invention relates to the routing of messages and events in a business-to-business messaging system.

BACKGROUND

Without clustering support, a Business-to-Business (B2B) component can have very limited failover and availability. The scalability of a B2B component can be further limited by the processing power of a single computer. Enterprises using an application integration system can require high availability as well as the ability to scale to large numbers of trading partners and messages.

B2B components presently use an endpoint or URL to identify each business partner, as well as to identify the business protocol being used. These differing URLs result in a servlet being dynamically registered for each URL when the trading partners are loaded. Deactivating a trading partner results in the servlet being destroyed. The registration and deactivation is accomplished by an internal call, which is not available in all B2B components. If there is no internal call available, the servlet cannot be removed. The result is a memory leak. Dynamic deployment of the servlets also has an impact on the way in which B2B is started when the system server starts. Finally, managing updates to these servlets across a cluster would be problematic.

BRIEF SUMMARY

Systems and methods in accordance with embodiments of the present invention can provide for improved request routing, such as to a business protocol specified in a client request. In one embodiment, servlets are used to process requests and generate responses. A default servlet is used to receive requests not handled by the servlets and to generate an error message. A business servlet can be used to process a request by routing the request to a destination for a specified business protocol, such as to a servlet or piece of code intended to handle that protocol. The business servlet can route the request to the default servlet if the business servlet does not recognize the destination of the request. The server receiving the request from the client is adapted to route the request to one of the servlets or default servlet, depending on whether the server recognizes the destination, or URL, of the request. The business servlet can be registered as the default such that it receives requests that the server does not recognize. If the business servlet does not recognize the destination of the request, the business servlet can redirect or forward the request to the default servlet.

In another embodiment, a server receiving a request can forward a request received from a client to a business servlet. If the business servlet recognizes the request, the business servlet can forward the request to the appropriate protocol destination. If the business servlet does not recognize the request, the business servlet can use a mechanism such as an internal API to determine the appropriate servlet to receive the response and can forward the request to that servlet. If the business servlet cannot determine the appropriate servlet, the business servlet forwards the request to the default servlet.

In another embodiment, the server receiving the request has a filter capable of determining whether an associated servlet should receive the request. There can be a filter for the business servlet and every other servlet except for the default servlet. The filters can use a lookup table containing address information for help in determining the destination of the request. The filters can act as a chain, with the default servlet at the end of the chain. Each filter can either forward the request to the associated servlet if the filter recognizes the request, or can forward to the next filter in the chain. This process can continue until one of the filters recognizes the request or the default filter receives the request.

Another embodiment occurs in a clustered environment. An administration server for a cluster can receive a request from a client and can use a load-balancing algorithm to select a cluster server to receive the request. A filter on the selected cluster server can determine the appropriate destination for the request using a lookup table and can forward the request appropriately. This can continue until the request is processed or is received by a default servlet.

Other features, aspects, and objects of the invention can be obtained from a review of the specification, the figures, and the claims.

DETAILED DESCRIPTION

Figure 1:
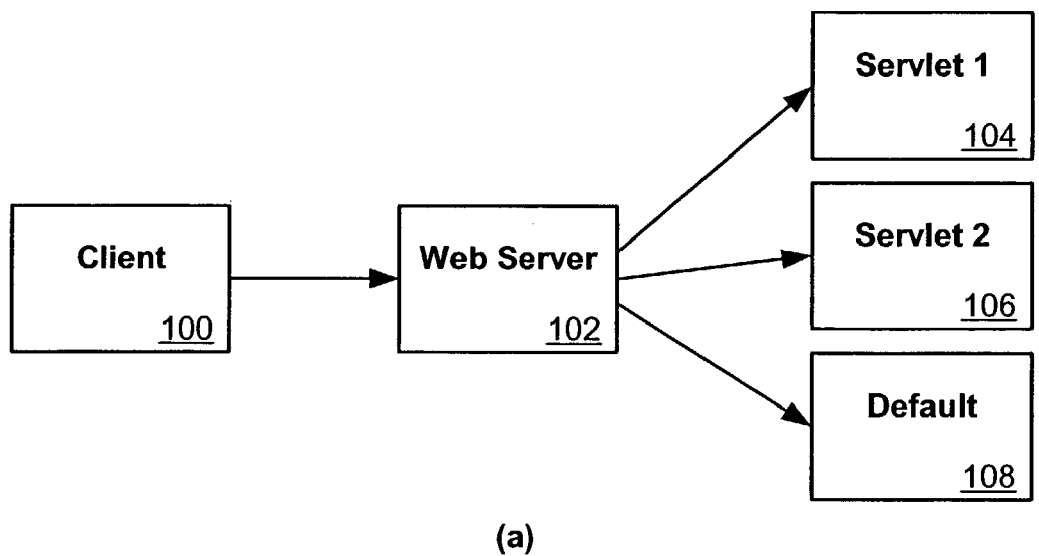
FIG. 1 is a diagram of a system that can be used in accordance with one embodiment of the present invention.
Figure 1:
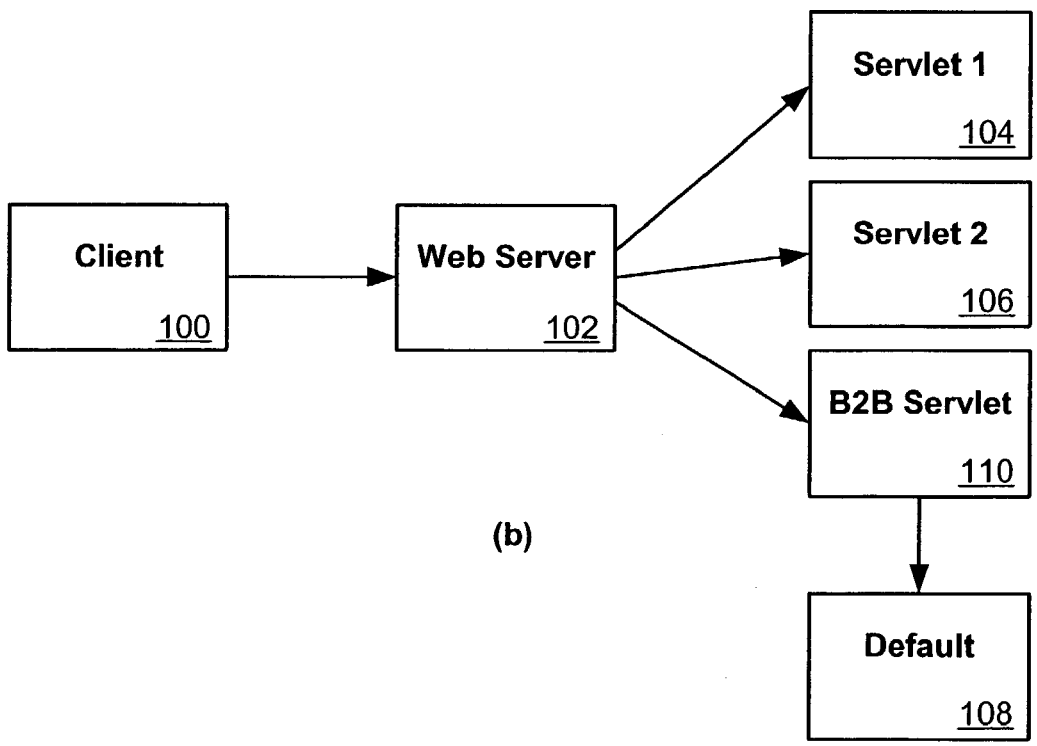

Systems and methods in accordance with embodiments of the present invention can utilize a clusterable B2B component that can enable users to build B2B solutions with greatly improved levels of availability and scalability. A single servlet can be utilized for B2B in order to direct messages to different trading partners or business protocols. This can solve problems with servlet destruction, the B2B startup class, and servlet management in a cluster. The single servlet can use different file paths, with each file path being the part of a URL following the scheme, host, and port, for example. This can be managed across a cluster by local mapping tables, which can be updated via Managed JavaBeans (MBeans).

If the base of the file path is frozen per integration system deployment, a single servlet can process the different subpaths quite easily. This could be the case for URLs such as, for example:

http://www.myserver.com:7001/basepath/subpath1
http://www.myserver.com:7001/basepath/subpath2/maybemore However, given the freedom for choosing URLs that can be allowed, it may be preferable to not require the freezing of paths, at least in some embodiments.

This flexibility can be recovered in one embodiment if the B2B servlet is made to be the "default" servlet of the system cluster. Any servlet request not found for processing by other servlets can be sent to the default servlet. The B2B servlet, as the default servlet, can lookup the specified file path in an appropriate mapping table or 'hash' table.

If the mapping exists, the servlet can activate the specified business protocol to process the message. If the mapping does not exist, the servlet can pass the request on to the normal default servlet, such as a FileServlet that can report "file not found" errors. One way to accomplish this is to subclass the default servlet to add the B2B functionality. Another way to accomplish this is through the use of a forward( ) method. A forward( ) method can be used to transfer control from a B2B servlet to a named servlet. The method can transfer to the previously installed default servlet, presuming that the name of the default servlet is available through an MBean API.

Another way is to take advantage of the new "filter" capability introduced with version 2.3 of the Java Servlet specification set forth by Sun Microsystems, Inc., of Santa Clara, Calif. A Java class can be provided that can intercept a servlet request and dynamically provide additional restrictions or information. This can be a preferred approach in certain embodiments.

In present messaging systems, a different URL is used to specify each location to which a message can be routed. Such locations can include functionality to process the messages using business protocols such as RosettaNet, ebXML, or XOCP. One problem with this approach is that a new servlet has to be created and deployed each time a new location or protocol is added to the system. Deploying additional servlets in a clustered environment can become problematic, as it is necessary to inform each node in the cluster to install this servlet everywhere so the system can handle the new protocol. It is then necessary to send out these messages, as well as to ensure that the servlets are properly loaded and deployed. Further, the issue of loading a servlet is not a straightforward task. When the need for a protocol ends, it can be desirable for the protocol to disappear. It is then necessary to undeploy each servlet and do away with each servlet URL.

It is therefore desirable to use a mechanism in accordance with one embodiment that provides for a single servlet to be deployed initially as the B2B environment is brought up. This mechanism can set up a "promiscuous" listener that will listen to everything coming into any servlet in the cluster. The listener can check where each message is bound, and if the listener does not recognize the destination, the listener can allow the message to pass to a default destination.

In a system in accordance with one embodiment of the present invention, each protocol can be pre-registered such that it appears as a URL. Once a protocol appears to the system as a URL, a filter or interceptor can pass the protocol as a hidden servlet that deals with such URLs. A filter is generally a piece of code that can transform the contents or requests and responses. Filters do not create responses as do servlets, but instead modify or adapt requests and responses. The servlet can stash the real address and forward it to the underlying address. A table can be used to hold the real and underlying addresses, such that subsequent messages can be routed more quickly. The table itself can be dynamically updated. There is then no need to install or uninstall additional servlets. When the addresses are removed from the table, the system will direct requests to the default servlet, which can return a normal "404" error of "file not found."

There are at least three approaches that can be used in accordance with embodiments of the present invention. In one approach, which can be used with the system of FIG. 1, a Web server 102 routes a request from a client 100 to a default servlet 108 if the Web server 102 does not otherwise know where the request is to be routed. There can typically be only one default servlet 108, such that if an application were to require that an application-specific servlet be the default servlet there would be a conflict with any other product or user that needed a default servlet. Instead, it is possible to add processing that takes advantage of the default servlet for a system. An object or method, for example, could be implemented that would know to pass to the file server anything that object or method does not understand. These requests could then be received by a B2B servlet 110, for example, as shown in FIG. 1(b). If no other destination accepts a request, the request can be routed to the B2B servlet 110, which has been inserted between the Web server 102 and the default servlet 108.

There can be various servlets installed at the front of the Web server 102. A client 100 can send a request to a URL that is received by the Web server 102. Based on the URL specified in the request, the Web server 102 knows which piece of code to activate in order to serve the request. There can be a default servlet 108 to which any request is directed if the URL is not recognized. Therefore, the Web server 102 can first try to send a request to one of the servlets 104, 106 hosted by the Web server 102, and if that send fails the Web server 102 can send the request to the default servlet 108. The default servlet then can be responsible for sending an error message such as "URL not Found", or the HTML for a Web page that will provide a similar error message. A B2B servlet 110 can be registered as the "default" servlet, which could then pass the request to the "real" default servlet 108 if the B2B servlet 110 does not understand the URL. Again, this is a problem if a user can specify the default servlet, as the B2B servlet may not know where to direct requests that it does not recognize.

Figure 2:
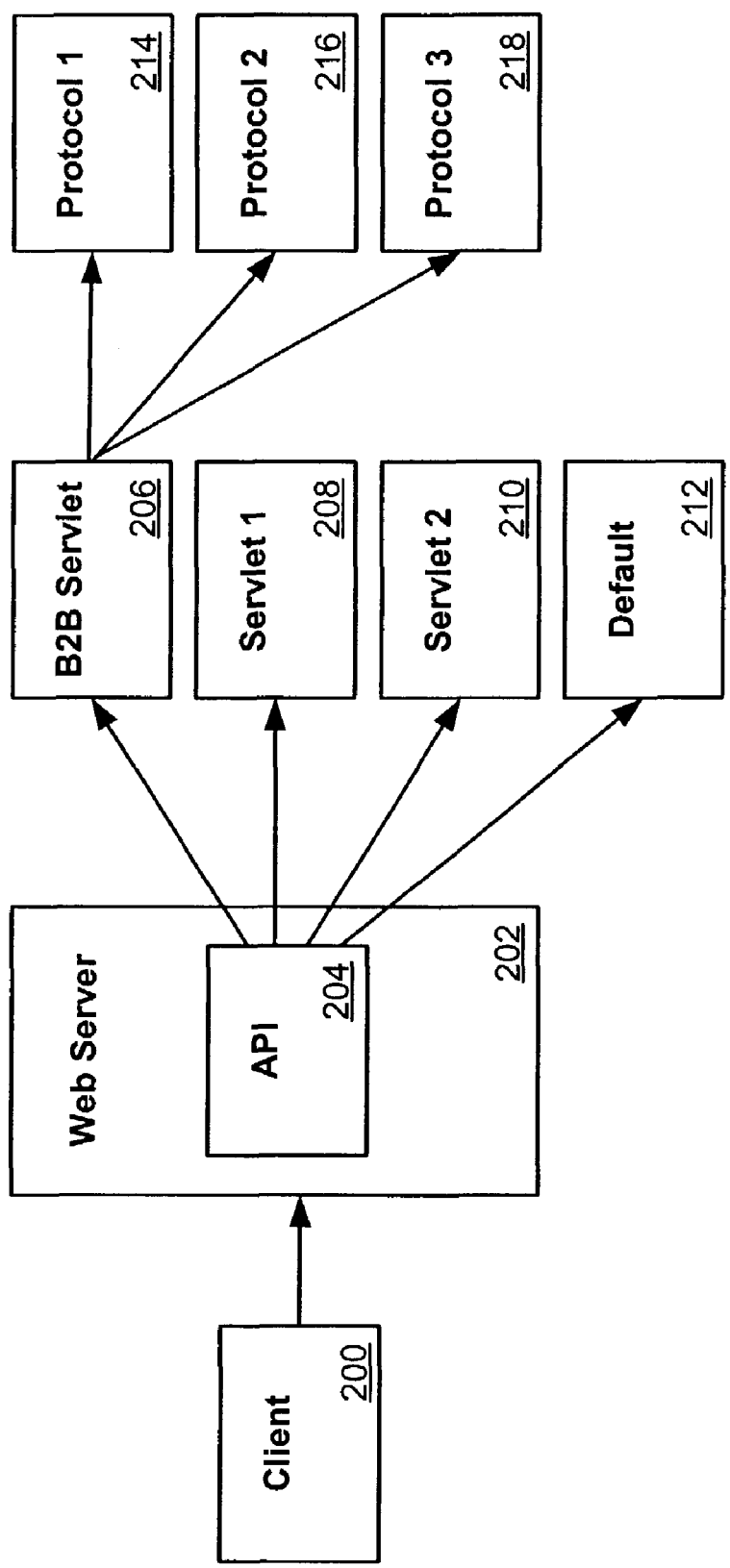
FIG. 2 is a diagram of a system that can be used in accordance with a second embodiment of the present invention.

A second approach, which can be used with the system of FIG. 2, passes a request from a client 200 on to another servlet, such as a B2B servlet 206, using a built-in forwarding API 204 of the Web server 202 receiving the request. This is different from the first approach, in that the B2B servlet 206 can be one of the first locations to look at the request, and if the B2B servlet 206 does not understand the request, the B2B servlet 206 can then look up the appropriate servlet through internal APIs and use a forwarding mechanism to pass the request to the appropriate servlet, such as servlet 208 and servlet 210. A request can either be forwarded or redirected, both of which can be done with servlets. A redirect tells a request to go to another address, which can be problematic in an environment that includes firewalls and security protocols, as it may not be possible to directly talk to some of those addresses. A forward has a downside as well, as it can lose the original address such that it cannot be determined where the request has been.

A client can submit a request to the Web server that can utilize prefixes. For example, a base request might specify:

http://www.someURL.com:7001/ which specifies port 7001 on the IP address represented by the domain name "someURL.com." The user can also specify a prefix, such as B2B, which could be used to make requests such as:

http://www.someURL.com:7001/B2B/ebXML/
http://www.someURL.com:7001/B2B/RosettaNet/
http://www.someURL.com:7001/B2B/XOCP/

For each of these URLs, even though the URL specifies a different destination, each URL can be intercepted due to the user of the "B2B" prefix. Some underlying API calls can be done to determine whether the destination is known. If the destination is known, the request can be forwarded appropriately, such as to one of the B2B-registered protocols 214, 216, 218. One of the problems with such an approach is that everything may need to be prefixed, which can cause problems supporting existing systems that do not use prefixes.

Figure 3:
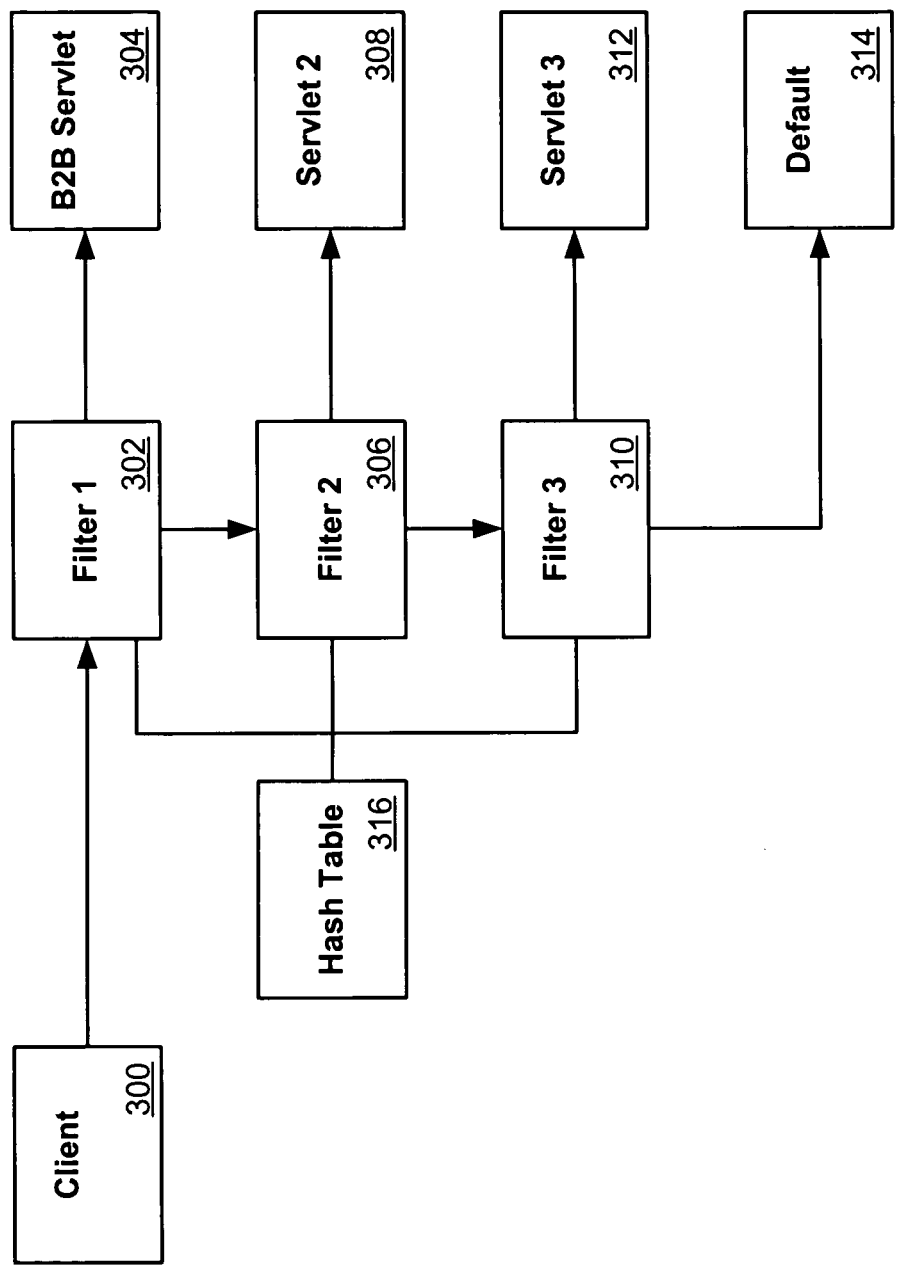
FIG. 3 is a diagram of a system that can be used in accordance with another embodiment of the present invention.

A third approach can be used with the system of FIG. 3. Such an approach utilizes a forward method, but forwards the requests such that the system knows to which address the request is being forwarded, as well as the original address for the request. This could use a hash table 316, for example, which can store the original address and the underlying address. The request from the client 300 can be forwarded to the underlying address, and the original address can be retrieved by the system as needed. There can be a number of servlets 308, 312, and a B2B servlet 304 can be added to the Web server. Filters 302, 306, 310 can be defined on an individual servlet level, and can be targeted for a number of servlets or all the servlets.

When a request is received to one of the filters 302, 306, 310, the filter can determine whether it recognizes the URL in the request. If the URL is recognized by filter 302, for example, the request can be forwarded to the B2B servlet 304, which can be registered under an internal name that users will not see directly. If the request is not recognized, it can be forwarded to the filter 306 for the next servlet 308. A request can keep passing through filters 302, 306, 310 until it is either recognized or is forwarded to the default servlet 314. The filters can assume that there is going to be a chain of filters as well as the default servlet, such that if a filter does not recognize a URL it simply forwards the request to the next in the chain. If the URL is recognized, it can be forwarded to the servlet directly, using the internal name. It can still be necessary to retain the original URL, such that the URL is retrievable and the switch business protocol requested can be done.

The servlet infrastructure can know how to do chaining between the filters and the final destination of a particular servlet. To reach a specific servlet, such as the B2B servlet, a "virtual URL" can be specified in the request. This URL is called virtual because it does not correspond to an actual URL. If such URL is detected by a filter, the request can be bounced back by the server with a message indicating that the URL does not exist. Again, if the user replaces the default servlet with a user-specific servlet, it does not matter because the default servlet will still be in the chain. The transport servlet is independent of the default servlet in this embodiment.

The filter can use what effectively amounts to a lookup table, in which the filter can lookup any URL it receives to determine whether the filter recognizes that URL as belonging to the associated servlet. This is a quick lookup, as the table is a hash table and a query on the table involves a text string. If the URL is recognized, it is processed. If the URL is not recognized, the request is passed on to the next filter or the default servlet, whichever is next in the chain. If the URL is recognized, the filter can get the appropriate instance of various things to call and process the request to the servlet. The servlet has to receive not the current incoming destination but the original incoming destination. It can be necessary for the servlet to receive the original incoming destination because the URL was rewritten, and it specifies a transport servlet, for example, and a server receiving the request will not have a protocol for a transport servlet. Since the original URL is in a special header in the transport package, the server can simply extract the original URL and process the request as normal. Using this approach, protocols can be added and removed "on the fly" since the hash table can be populated and depopulated dynamically. Present systems require installing and uninstalling servlets on the fly, which can be problematic and unnecessarily resource intensive.

Once the request gets to the B2B servlet, the request can appear as a normal request to the servlet and the servlet can simply process the request. Once the transport servlet receives and decodes the URL, the URL can look like it always did, even internally to the system. After the processing is completed, a response will go back to the requester, or client, as a standard response. This approach can be desirable, as it is transparent on both sides. No filtering is done on the response, the only filtering done when incoming messages are intercepted.

The system can take advantage of objects such as HTTP servlet request objects and HTTP servlet response objects. A servlet request object can contain all the incoming information, and a servlet response object can be filled with the outgoing information. Servlets normally take both a request argument and a response argument. A filter can be set up the same way, so that as long as the underlying code reads from the request and sends information back in the response. The filter can 'transparently' bypass the filter. The response can be captured in the filter in some embodiments. This can be done to change or add outgoing information, for example, such as to add a copyright statement to the bottom of each response page. In some embodiments, only the destination is being changed, such that the system is being used purely for routing.

When a filter receives a request, it can be compared to the destination URL. Here, 'destination' is not the destination to which the request is being sent, but is the destination on which the request is received. The system is looking at the incoming URL. The filter can examine the path of the incoming URL, and can determine whether the associated business protocol is registered under that path. If the filter has a servlet for a protocol registered under that path, the filter can route the request to that servlet. Otherwise, the request passes to the next filter or servlet in the chain.

If the URL is recognized, the request can go to a transport servlet. In order to give the request to the transport servlet, the URL can be changed to the transport servlet. At this point the path can be stripped, such as to remove the protocol identification information. The system can utilize "transport" headers that can contain the information being sent, as well as any additional information. This additional information can include the original URL. The transport servlet can then check the transport header to determine whether to use the URL that the request came in on or the one identified in the header.

Figure 4:
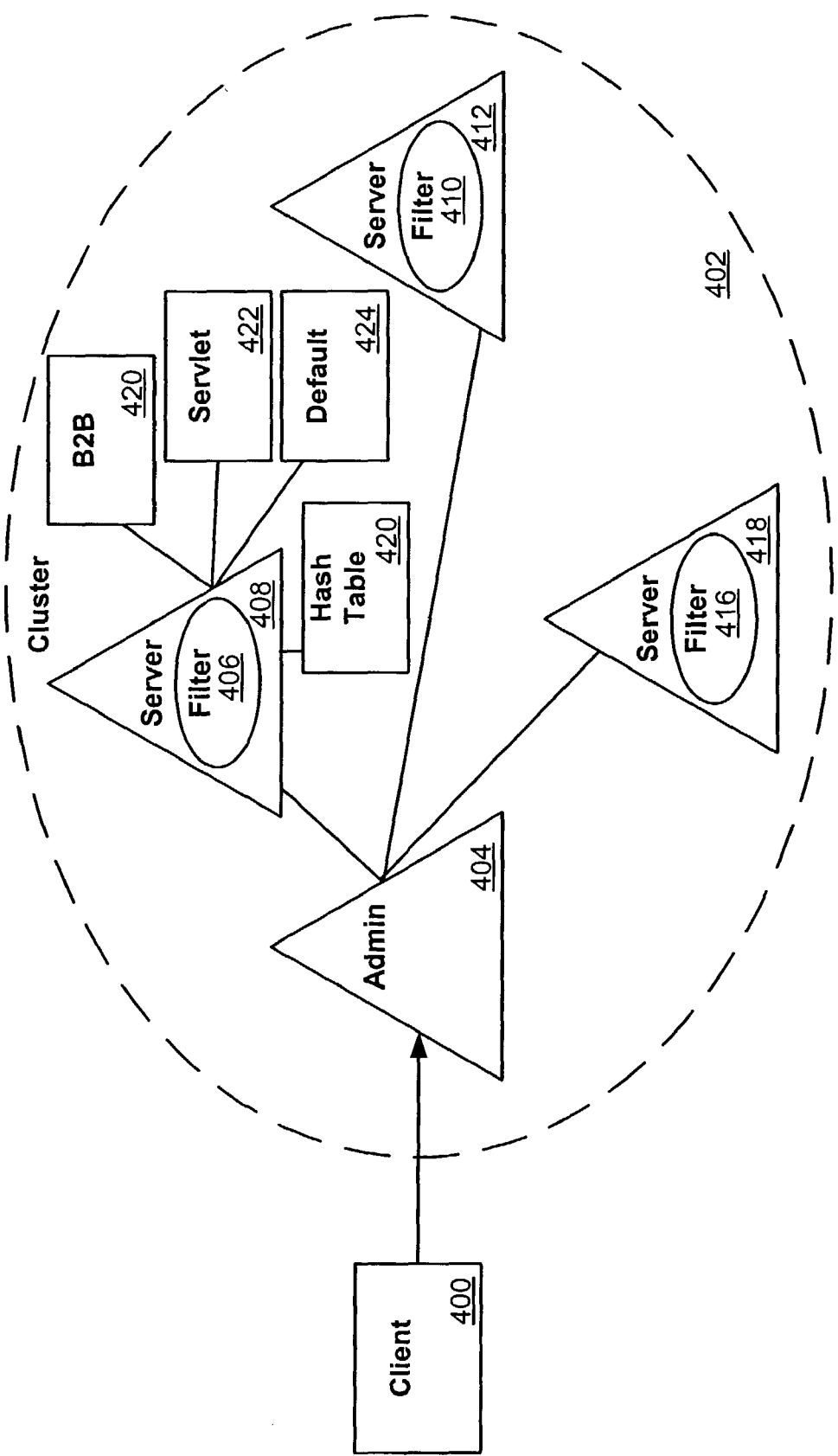
FIG. 4 is a diagram of a clustered system that can be used with the embodiment of FIG. 3.

Advantages of such a system can be realized in a clustered environment, as shown in FIG. 4. There can be a front end to a cluster 400, as well as various nodes in the cluster. If there is an administration (admin) server 404 in the cluster 400, and a user wishes to add a protocol, the user may have to install a servlet on each of the machines or nodes in the cluster. If the protocols are to be distributed across the nodes of the cluster, a load-balancing algorithm can be used to determine the node to receive the servlet. The servlet then needs to be installed before use, and uninstalled after use.

In a system in accordance with an embodiment of the present invention, it still may be necessary to inform the individual nodes that the protocol has been added. In such a system, however, it is sufficient to inform the nodes 404, 408, 412, 418 that something has been added to the hash table 420 to which they should pay attention. When the protocol is to be removed, the appropriate information can simply be removed from the hash table 420. It is not necessary to go through the process of destroying the servlet. The request can come into the cluster 402 from a client 400 and get routed to one of the nodes 408, such as by doing load balancing using the admin server 404. A filter can be deployed on each node in the cluster. The admin server 404 can act as a cluster router to distribute the load. A distribution algorithm such as round robin can be used, which can be implemented either through hardware or software.

The protocols are then not added to the nodes themselves, but are instead distributed in a lighter form. It can be sufficient to inform the nodes that a new protocol exists in the cluster, and it is not necessary to add or install servlets, or change any existing servlets. Similarly, none of the filters needs to be changed. The only thing that may need to be changed is the value in the hash table 420 or lookup table. The server 400 receiving the request from the admin server 404 can examine the request with a filter 406 using the hash table 420. If the filter 406 recognizes the URL, the filter can route the request to a B2B servlet 420 or other servlet 422 hosting that protocol. If the filter 406 does not recognize the URL, the request can be routed to the default servlet 424.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for routing requests from clients to a plurality of different business protocols, the system comprising:
a server, executing on a computer, that is operable to receive requests from clients, process the requests using servlets executing on the server, and return responses to the clients, wherein the server is further operable to route the requests to the appropriate servlets based on a destination uniform resource locator (URL) of each request, and wherein the server includes a forwarding application program interface (API);
a business servlet executing on the server that is operable to receive the requests from the server, process the requests and route the requests using an internal API to one of other servlets executing on the server, and appropriate business protocol destinations;
a plurality of servlets executing on the server that are each operable to receive the requests from the server, process the requests, and generate responses to be sent to the clients, wherein the plurality of servlets includes a default servlet executing on the server operable to process the requests and generate error responses to the clients;
wherein when a request is received at the server from a client, the server forwards the request to an appropriate servlet executing on the server using the forwarding API based on the destination URL associated with the request to process the request, wherein if no appropriate servlet is identified then the request is forwarded to the default servlet, and wherein if the appropriate servlet is the business servlet then if the business servlet recognizes the destination URL in the request, the business servlet routes the request using the internal API to one of the plurality of servlets or the appropriate business protocol destination executing on the server that can process a business protocol specified in the request to process the request, if the business servlet does not recognize the destination URL in the request, the business servlet forwards the request to one of the plurality of servlets executing on the server by looking up an appropriate servlet through the forwarding API, and if the business servlet neither recognizes the destination URL in the request nor is able to find an appropriate servlet to which to forward the request, the business servlet routes the request to the default servlet and the default servlet generates an error response to the client, wherein the error response is sent from the server to the client.

2. The system according to claim 1, wherein:
the server is a Web server adapted to receive HTTP requests from clients.

3. The system according to claim 1, wherein:
the server is adapted to route the request based on the URL of the request.

4. The system according to claim 1, wherein:
the server routes the request using a built-in API.

5. The system according to claim 1, wherein:
the server is adapted to route the request based on a prefix in the URL of the request.

6. The system according to claim 1, wherein each business protocol is pre-registered such that it appears as a URL.

7. The system according to claim 1, further comprising a listener which:
monitors all incoming messages to the business servlet and the plurality of servlets; checks where each incoming message is bound; and
if the listener does not recognize the destination, the listener can allow the message to pass to a default destination.

8. A system for routing requests from clients to a plurality of different business protocols, the system comprising:
a server, executing on a computer, operable to receive requests from clients, process the requests using servlets executing on the server, and return responses to the clients;
a lookup table on the server containing address information for routing requests from the clients;
a business servlet executing on the server that is operable to receive the requests from the server, process the requests and route the requests using an internal API to one of other servlets executing on the server, and appropriate business protocol destinations;

a plurality of servlets executing on the server, each operable to receive the requests from the server, process the requests, and to generate responses to be sent to the clients;

a chain of filters on the server, including a first filter in the chain of filters corresponding to the business servlet, operable to receive a request forwarded from the server, and a filter corresponding to each one of the plurality of servlets executing on the server, wherein each filter is capable of determining, using the lookup table, whether the filter recognizes a destination URL associated with the request as belonging to one of the plurality of servlets;

a default servlet, included in the plurality of servlets executing on the server, operable to process requests and generate error responses to the clients;

wherein when a request is received at the server from a client, the server forwards the request to the chain of filters, and wherein if the first filter recognizes the destination URL in the request, the first filter routes the request to the business servlet, if the business servlet recognizes the destination URL in the request, then the business servlet routes the request using the internal API to one of the plurality of servlets or the appropriate business protocol destination executing on the server that can process a business protocol specified in the request to process the request, if the first filter does not recognize the destination URL in the request, the request is iteratively routed to the remaining filters of the plurality of filters until one of the remaining filters recognizes the destination URL in the request, then the request is routed by the recognizing filter to its corresponding servlet executing on the server which processes the request and generates a response to the client, wherein the response is sent by the server to the client; and if none of the filters recognizes the destination URL in the request, the request is routed to the default servlet by the last filter in the chain of filters and wherein the default servlet generates an error response to the client, wherein the error response is sent by the server to the client.

9. The system according to claim 8, wherein:
the lookup table contains address information comprising original destination information and internal destination information.

10. The system according to claim 8, wherein each business protocol is pre-registered such that it appears as a URL.

11. The system according to claim 8, further comprising a listener which:
monitors all incoming messages to the business servlet and the plurality of servlets;
checks where each incoming message is bound; and
if the listener does not recognize the destination, the listener can allow the message to pass to a default destination.

12. A method for routing requests from clients to a plurality of different business protocols, the method comprising:
receiving, by a server, a request from a client which includes a destination uniform resource locator (URL), wherein the server is operable to receive requests from clients, process the requests using servlets executing on the server, and return responses to the clients, and wherein the server includes a forwarding application program interface (API), a business servlet executing on the server that is operable to receive the requests, process the requests and route the requests using an internal API to one of other servlets executing on the server, and appropriate business protocol destinations, a plurality of servlets executing on the server that are each operable to receive the requests from the server, process the requests, and generate responses to be sent to the clients, wherein the plurality of servlets includes a default servlet;

forwarding the request from the server to an appropriate servlet executing on the server using the forwarding API based on the destination URL associated with the request to process the request, wherein if no appropriate servlet is identified then the request is forwarded to the default servlet;

if the appropriate servlet is the business servlet, then if the business servlet recognizes a destination URL in the request, routing by the business servlet using the internal API, the request to one of the plurality of servlets or the appropriate business protocol destination executing on the server that can process a business protocol specified in the request to process the request and generate a response to the client;

if the business servlet does not recognize the destination URL in the request, forwarding, by the business servlet, the request to one of the plurality of servlets executing on the server by looking up an appropriate servlet through the forwarding API, wherein the appropriate servlet processes the request and generates a response to the client, wherein the response is sent from the server to the client; and if the business servlet neither recognizes the destination URL in the request nor is able to find an appropriate servlet to which to forward the request, then routing, by the business servlet, the request to the default servlet, wherein the default servlet generates an error response to the client, and wherein the error response is sent from the server to the client.

13. The method according to claim 12, wherein each business protocol is pre-registered such that it appears as a URL.

14. The method according to claim 12, further comprising:
monitoring, by a listener, all incoming messages to the business servlet and the plurality of servlets;
checking where each incoming message is bound; and
if the listener does not recognize the destination, allowing the message to pass to a default destination.

15. A method for routing requests from clients to a plurality of different business protocols, the method comprising:
receiving a request from a client at a server operable to receive requests from clients, process the requests using servlets executing on the server, and return responses to the clients, wherein the server includes
a business servlet executing on the server that is operable to receive the requests from the server, process the requests and route the requests using an internal API to one of other servlets executing on the server, and appropriate business protocol destinations, a plurality of servlets, including a default servlet, executing on the server which are each operable to process requests from and generate responses to be sent to the clients, and wherein the plurality of servlets include a business servlet and a default servlet;

forwarding the request from the server to a first filter of a chain of filters on the server;

wherein the chain of filters includes the first filter corresponding to the business servlet, operable to receive the request from the server, and a filter corresponding to each one of the plurality of servlets executing on the server, wherein each filter in the chain of filters can determine, using a lookup table that contains address information for routing requests, whether the filter recognizes the destination URL as belonging to one of the plurality of servlets executing on the server;

if the first filter recognizes the destination URL in the request, then routing the request to the business servlet;

if the business servlet recognizes a business protocol specified in the request, then routing the request using the internal API to one of the plurality of servlets or the appropriate business protocol destination executing on the server that can process the business protocol specified in the request to process the request and to generate a response to the client;

if the first filter does not recognize the destination URL in the request, then iteratively routing the request to the remaining filters until one of the filters recognizes the destination URL in the request, wherein the recognizing filter then routes the request to its corresponding servlet which processes the request and generates a response to the client, wherein the response is sent by the server to the client; and if none of the filters recognizes the destination URL in the request, routing the request to the default servlet by the last filter in the chain of filters, and wherein the default servlet generates an error response to the client, wherein the error response is sent by the server to the client.

16. The method according to claim 15, wherein each business protocol is pre-registered such that it appears as a URL.

17. The method according to claim 15, further comprising:

monitoring, by a listener, all incoming messages to the business servlet and the plurality of servlets;

checking where each incoming message is bound; and if the listener does not recognize the destination, allowing the message to pass to a default destination.

* * * * *

UNITED STATES PATENT AND TRADEMARK OFFICE
CERTIFICATE OF CORRECTION

| | |
|---|---|
| PATENT NO. | : 8,135,772 B2 |
| APPLICATION NO. | : 10/404666 |
| DATED | : March 13, 2012 |
| INVENTOR(S) | : Wiser |

It is certified that error appears in the above-identified patent and that said Letters Patent is hereby corrected as shown below:

On front page, in column 2, under "Other Publications", line 2, delete "[retreived" and insert -- [retrieved --, therefor.

On page 3, in column 1, under "Other Publications", line 1, delete "Makherjee," and insert -- Mukherjee, --, therefor.

On page 3, in column 1, under "Other Publications", line 4, delete "[retreived" and insert -- [retrieved --, therefor.

On page 3, in column 1, under "Other Publications", line 27, delete "Configureable" and insert -- Configurable --, therefor.

On page 3, in column 2, under "Other Publications", line 2, delete "pas." and insert -- pp. --, therefor.

On page 3, in column 2, under "Other Publications", line 37, delete "Jave,"" and insert -- Java," --, therefor.

On page 3, in column 2, under "Other Publications", line 48, delete "Suport" and insert -- Support --, therefor.

Signed and Sealed this
Twenty-ninth Day of May, 2012

David J. Kappos
*Director of the United States Patent and Trademark Office*